United States Patent
Lee

(10) Patent No.: US 9,650,201 B2
(45) Date of Patent: May 16, 2017

(54) DISPENSING ADAPTOR FOR ONE-COMPONENT POLYURETHANE FOAM

(71) Applicant: Hamil Selena Co., Ltd., Gimhae-si, Gyeongsangnam-do (KR)

(72) Inventor: Dong-hoon Lee, Gimhae-si (KR)

(73) Assignee: Hamil Selena Co., Ltd. (KR)

( * ) Notice: Subject to any disclaimer, the term of this patent is extended or adjusted under 35 U.S.C. 154(b) by 0 days.

(21) Appl. No.: 14/858,067

(22) Filed: Sep. 18, 2015

(65) Prior Publication Data

US 2016/0001962 A1    Jan. 7, 2016

Related U.S. Application Data

(63) Continuation of application No. PCT/KR2013/007378, filed on Aug. 16, 2013.

(30) Foreign Application Priority Data

Mar. 21, 2013  (KR) .......................... 10-2013-0030201

(51) Int. Cl.
*B65D 83/14*    (2006.01)
*B65D 83/30*    (2006.01)
(Continued)

(52) U.S. Cl.
CPC ......... *B65D 83/303* (2013.01); *B65D 83/202* (2013.01); *B65D 83/28* (2013.01);
(Continued)

(58) Field of Classification Search
CPC .. B65D 83/201; B65D 83/206; B65D 83/303; B65D 83/46; B65D 83/202; B65D 83/28; B65D 83/752; B65D 83/30
(Continued)

(56) References Cited

U.S. PATENT DOCUMENTS 2,911,159 A  * 11/1959  Doyle ................. B65D 83/207
                                                    222/402.15
3,089,625 A  *  5/1963  Sorber ................ B65D 83/201
                                                        222/398
(Continued)

FOREIGN PATENT DOCUMENTS

DE            29515276 U1    2/1997
DE         102004012470 A1   3/2005
(Continued)

OTHER PUBLICATIONS

WIPO, International Search Report (PCT/KR2013/007378), Nov. 1, 2013.
(Continued)

*Primary Examiner* — Charles P Cheyney
(74) *Attorney, Agent, or Firm* — Park & Associates IP Law, P. C.

(57) ABSTRACT

A dispensing adaptor for one-component polyurethane foam, which is coupled to a valve stem of a polyurethane pressurized container, the dispensing adaptor including: a tubular main adaptor body coupled to the valve stem and introducing polyurethane foam out of the pressurized container; a stem coupling portion formed at one end portion of the adaptor main body and coupled to and communicating with the valve stem; a discharging pipe extended from the other end portion of the adaptor main body; a stationary lever formed integrally with and extended from an outer wall of the adaptor main body; and an extended lever curvedly extended from the stationary lever along a lengthwise direction of the pressurized container, and making the valve stem be inclined to open with respect to an axial direction.

5 Claims, 6 Drawing Sheets

(51) Int. Cl.
*B65D 83/28* (2006.01)
*B65D 83/20* (2006.01)

(52) U.S. Cl.
CPC ............ *B65D 83/752* (2013.01); *B65D 83/30* (2013.01); *Y02W 30/807* (2015.05)

(58) Field of Classification Search
USPC ..... 222/402.11, 402.13, 402.15, 402.21, 182
See application file for complete search history.

(56) References Cited

U.S. PATENT DOCUMENTS

| | | | | |
|---|---|---|---|---|
| 4,044,922 A * | 8/1977 | Bordelon | .................. | F41H 9/10 222/183 |
| 5,927,563 A * | 7/1999 | Kellner | .................. | B65D 83/48 222/402.1 |
| 6,325,256 B1 * | 12/2001 | Liljeqvist | ............. | B65D 83/201 222/151 |
| 6,637,627 B1 | 10/2003 | Liljeqvist et al. | | |
| 6,705,494 B2 * | 3/2004 | Thompson | ........... | B65D 83/206 222/310 |
| 8,087,552 B2 | 1/2012 | Fazekas et al. | | |
| 2003/0075571 A1 | 4/2003 | Thompson et al. | | |
| 2005/0045664 A1 | 3/2005 | Taylor | | |
| 2006/0243754 A1 * | 11/2006 | Rackwitz | ............. | B65D 83/201 222/402.15 |
| 2007/0181610 A1 | 8/2007 | Fazekas et al. | | |
| 2010/0147902 A1 * | 6/2010 | De Schrijver | ....... | B65D 83/201 222/402.21 |
| 2013/0062369 A1 * | 3/2013 | Engel | .................. | B65D 83/201 222/402.15 |

FOREIGN PATENT DOCUMENTS

| | | |
|---|---|---|
| DE | 102009018528 A1 | 11/2010 |
| EP | 2060507 A2 | 5/2009 |
| JP | S54-181599 U | 12/1979 |
| JP | 2009-249026 A | 10/2009 |
| KR | 10-0778239 B1 | 11/2007 |
| RU | 2294876 C2 | 2/2005 |
| UA | 88451 C2 | 10/2009 |

OTHER PUBLICATIONS

Chinese Office Action, State Intellectual Property Office of People's Republic of China, Oct. 26, 2016.
Extended European Search Report, European Patent Office, Nov. 4, 2016.
Kazakhstan Office Action, National Institute of Intellectual Property, Nov. 25, 2016.

\* cited by examiner

DISPENSING ADAPTOR FOR ONE-COMPONENT POLYURETHANE FOAM

REFERENCE TO RELATED APPLICATIONS

This is a continuation of pending International Patent Application PCT/KR2013/007378 filed on Aug. 16, 2013, which designates the United States and claims priority of Korean Patent Application No. 10-2013-0030201 filed on Mar. 21, 2013, the entire contents of which are incorporated herein by reference.

FIELD OF THE INVENTION

The present invention relates to a dispensing adaptor for dispensing one-component polyurethane foam filled in a pressurized container.

BACKGROUND OF THE INVENTION

One-component polyurethane, which has been widely used for the purpose of insulation, soundproofing, filling, sealing, etc. in various fields as well as a building, is provided as it is together with high-pressure gas filled in a pressurized container.

FIG. 1 schematically shows a conventional disposable dispensing gun for dispensing polyurethane. As shown therein, the conventional disposable dispensing gun includes an adaptor main body 10 put on and coupled to a valve stem VS formed at a top center portion of a pressurized container PC, a protruding lever 20 stationed in a direction transverse to the adaptor main body 10, a discharging portion 30 having a predetermined angle to an end portion of the adaptor main body 10, and an injection pipe 32 coupled to the discharging portion 30.

To use such a dispensing gun, a user generally needs both hands. For example, a user holds the pressurized container PC upside down with one hand, and obliquely upward pulls the lever for operation 20 protruded from the adaptor main body 10 with the other hand. The operation of the lever 20 makes a lower end portion of the valve stem VS be inclined to open a valve, so that one-component polyurethane liquid filled in the pressurized container PC can come out to the adaptor through the valve stem VS. The liquid polyurethane coming out to the outside is discharged to a target place via a hollow pipe formed in the adaptor main body 10, a discharging pipe 30 and an outlet pipe 32.

However, such a conventional disposable dispensing gun is difficult to be held with one hand since the lever for operation 20 is disposed distantly from the main body of the pressurized container PC, and thus both hands are needed. If both hands are not free during dispensing works for a building or the like equipment, there are problems of significantly lowering work efficiency and safety.

Further, if the work is temporarily suspended in the state that polyurethane remains inside the pressurized container, the residual polyurethane in the outlet pipe 32, the discharging pipe 30 or the like becomes hard, and therefore the dispensing adaptor has to be chucked away and replaced by a new one in order to the work.

SUMMARY OF THE INVENTION

An aspect of the present invention is to solve the foregoing problems and provide a dispensing adaptor for a one-component polyurethane pressurized container, which is excellent in work efficiency and safety since it can be used with only one hand of a user.

Another aspect of the present invention is to provide a dispensing adaptor for a one-component polyurethane pressurized container, use of which can be resumed even after its use is suspended.

The foregoing and/or other aspects of the present invention are achieved by providing a dispensing adaptor for one-component polyurethane foam, the dispensing adaptor including: a tubular main adaptor body coupled to a valve stem of a polyurethane pressurized container and introducing filled polyurethane foam out of the pressurized container; a stem coupling portion formed at one end portion of the adaptor main body and coupled to and communicating with the valve stem; a discharging pipe extended from the other end portion of the adaptor main body and dispensing the polyurethane foam; a stationary lever formed integrally with and extended from an outer wall of the adaptor main body in a direction transverse to an axial direction of the pressurized container; and an extended lever curvedly extended from the stationary lever along a lengthwise direction of the pressurized container, and making the valve stem be inclined.

Further, the extended lever may be detachably coupled to the stationary lever so that the pressurized container can be easily packaged, carried and kept, and may have a tubular shape in consideration of reduction of manufacturing costs, easiness of detachability, etc.

Also, one of the adaptor main body and the stationary lever may include a peg to which the extended lever being on standby is coupled and kept. Further, the extended lever may be coupled to the stationary lever by a hinge, and the hinge may include a film hinge.

In addition, the extended lever may include a blocking projection to be inserted in a free end portion of a detachably-coupled outlet pipe in order to cut off air inflow and prevent the outlet pipe from clogging up.

Thus, according to the present invention, the stationary lever extended in a direction transverse to the axial direction of the pressurized container, and the extended lever curvedly extended from the stationary lever along the lengthwise direction of the pressurized container make it possible to hold the pressurized container and the extended lever with one hand, thereby improving work efficiency and safety. Further, the end portion of the outlet pipe is temporarily blocked when the disposable dispensing adaptor is not in use, so that the disposable dispensing adaptor can be used again.

DETAILED DESCRIPTION OF THE INVENTION

Below, embodiments of the present invention will be described in detail with reference to accompanying drawings.

Figure 1:
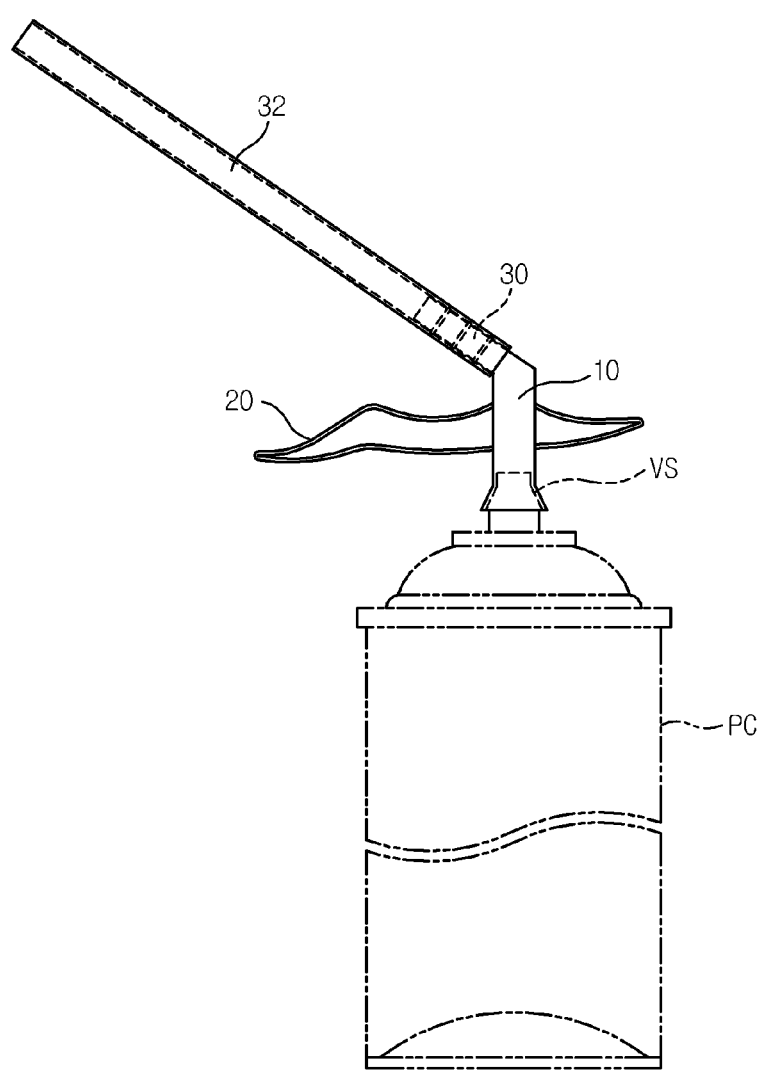
FIG. 1 is a schematic view of a conventional disposable dispensing adaptor.
Figure 2:
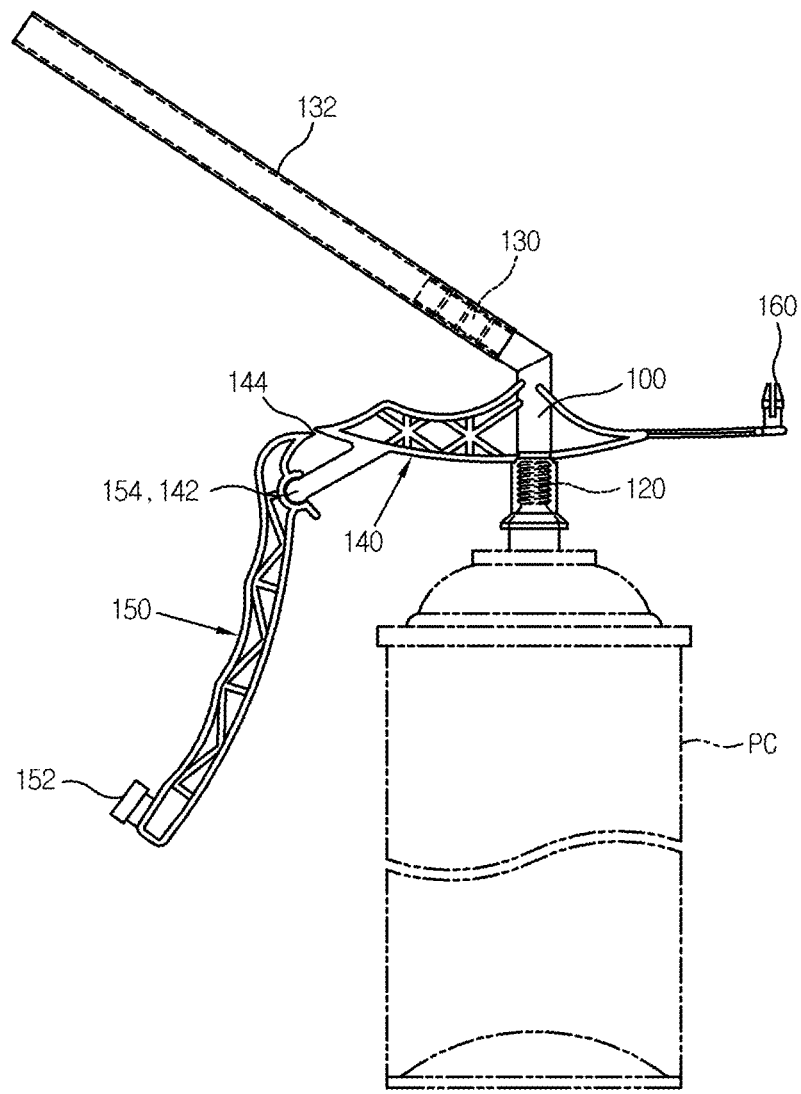
FIG. 2 shows a disposable dispensing adaptor according to an embodiment of the present invention when it is used.

As shown in FIG. 2, a disposable dispensing adaptor includes an adaptor main body 100 coupled to a valve stem VS formed at a top end portion of a pressurized container PC, a stem coupling portion 120 formed at one end portion of the adaptor main body 100 and coupled to and communicate with the valve stem VS, a discharging pipe 130 extended from the other end portion of the adaptor main body 100 and dispensing polyurethane, a stationary lever 140 formed integrally with an outer wall of the adaptor main body 100 and extended in a direction transverse to an axial direction of the pressurized container PC, and an extended lever 150 curvedly extended from the stationary lever 140 along a lengthwise direction of the pressurized container PC in order to make the valve stem VS be inclined.

FIG. 2 shows that the adaptor main body 100 is coupled to the valve stem VS of the pressurized container PC so as to use the disposable dispensing adaptor. As shown therein, the extended lever 150 coupled to the stationary lever 140 is curved downwardly at dispensing works. At this time, a support projection 142 protruding from the stationary lever 140 is inserted in and coupled to a projection accommodator 154 recessed in the extended lever 150. The stationary lever 140 and the extended lever 150 are relatively strongly coupled by coupling between the support projection 142 and the projection accommodator 154.

During the dispensing works, a worker makes the pressurized container PC upside down so that the valve stem VS can face downward, and pulls the extended lever 150 toward the pressurized container PC in the state that the stationary lever 140 and the extended lever 150 are strongly coupled to each other. The action of the worker is transferred to the stationary level 140 through the extended lever 150, and thus the valve stem VS is inclined with respect to the pressurized container PC. If the valve stem VS is inclined, a lower end portion of the valve stem VS is open so that liquid polyurethane pressurized by gas can come out through a hollow of the valve stem VS. The coming-out polyurethane passes through the stem coupling portion 120 coupled to and communicating with the valve stem VS, the adaptor main body 100, the discharging pipe 130 and the outlet pipe 132 in sequence, and is then disposed to a target portion.

The stationary lever 140 and the extended lever 150 are connected by a film hinge 144 as they are molded as a single body, so that the extended lever 150 can rotate with respect to the film hinge 144. Alternatively, the film hinge 144 may be substituted with a hinge pin or the like hinge.

Figure 3:
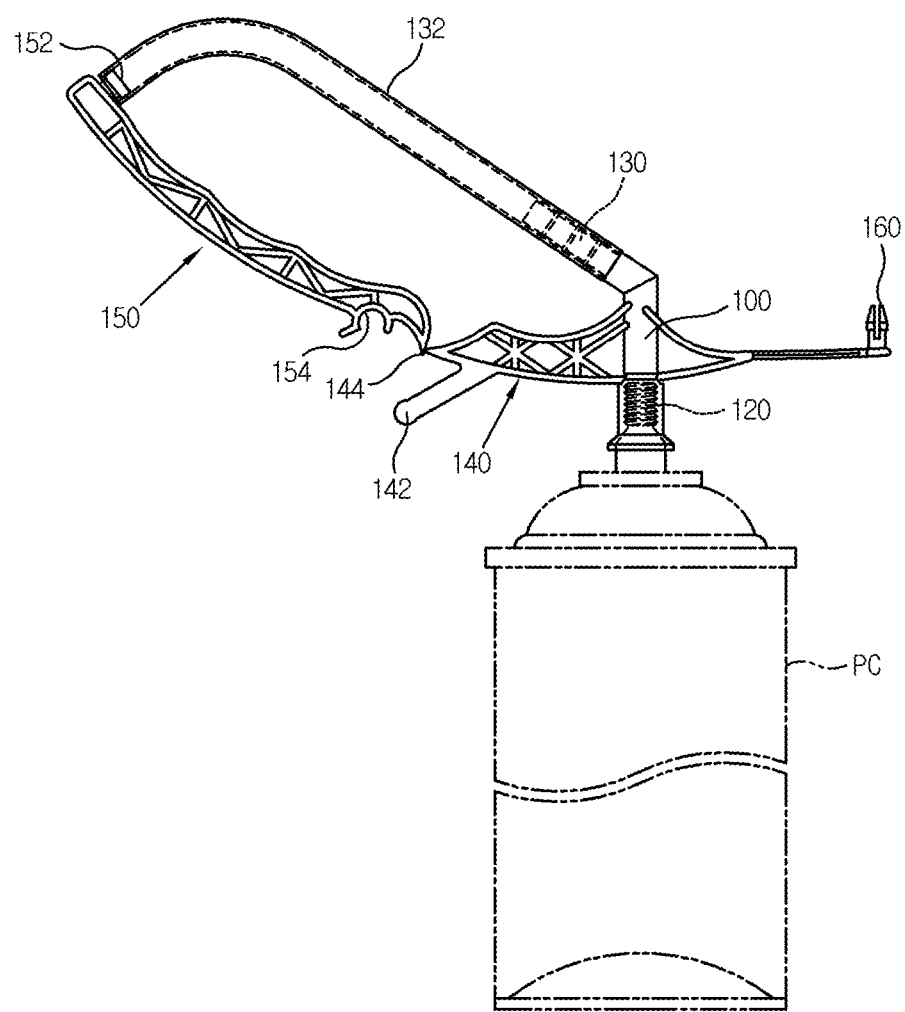
FIG. 3 shows the disposable dispensing adaptor when it is not in use.

FIG. 3 shows the disposable dispensing adaptor when it is not in use. At an end portion of the extended lever 150 is provided a blocking projection 152 that can be inserted in a free end portion of the outlet pipe 132. While the disposable dispensing adaptor is not in use, the extended lever 150 can rotate toward the outlet pipe 132 with respect to the film hinge 144. In this state, the outlet pipe 132 is bent so that the blocking projection can be fitted to the end portion of the outlet pipe 132, thereby blocking up the outlet pipe 132. Therefore, external air is prevented from flowing into the outlet pipe 132, and the residual polyurethane in the outlet pipe 132 is thus prevented from contacting air. Consequently, the polyurethane remaining in the outlet pipe 132 is not hardened even while the dispensing work is suspended. The formation and size of the blocking projection 152 are determined in consideration of the inner diameter and material of the outlet pipe 132 so that insertion of the outlet pipe 132 and blocking-off of air can be properly performed.

Figure 4:
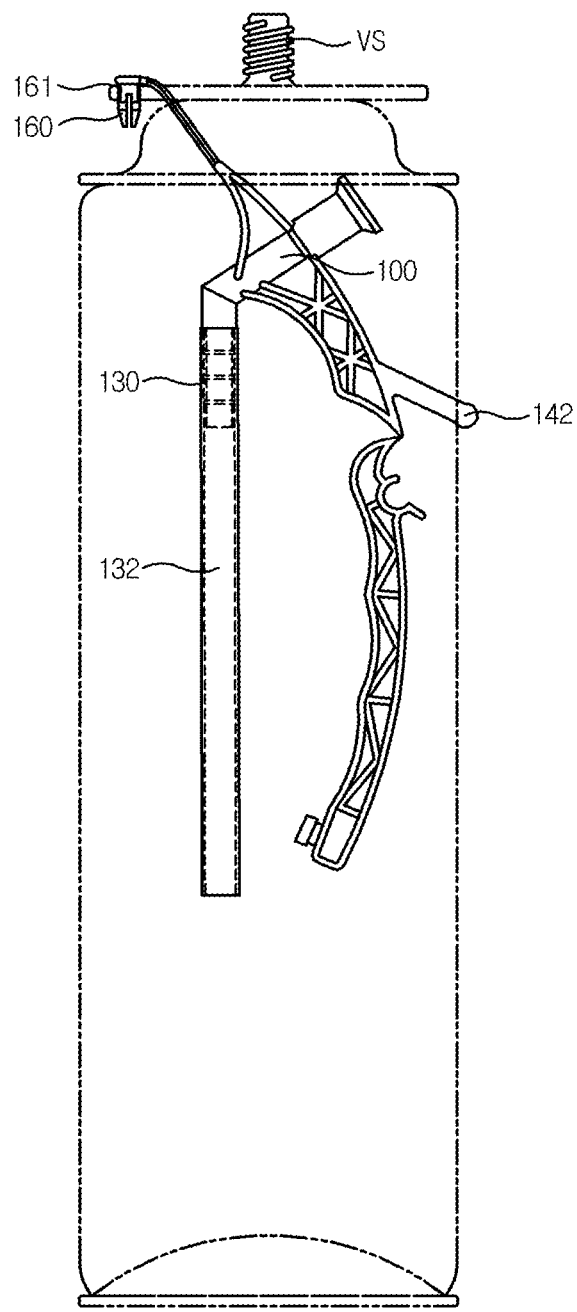
FIG. 4 shows the dispensing adaptor when it is kept before use.

The adaptor main body 100 includes a peg 160 formed integrally with and extended from the outer wall of the adaptor main body 100 so that the adaptor main body 100 can be detachably mounted to a standby mounting portion 161. As shown in FIG. 4, the adaptor main body 100 is mounted to the pressurized container PC by the peg 160 so as to be easily kept or carried together with the pressurized container PC. Alternatively, the peg 160 may be formed in the stationary lever 140.

Figure 5:
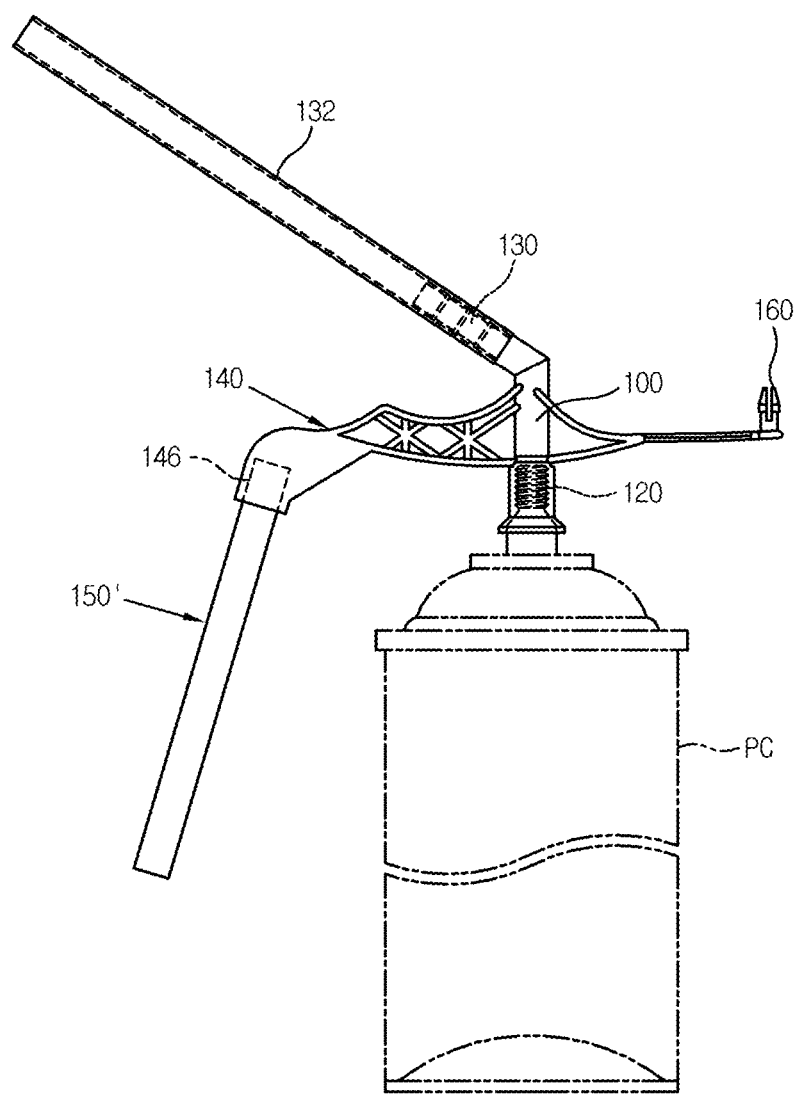
FIG. 5 is a front view of a disposable dispensing adaptor according to another embodiment of the present invention.

FIG. 5 shows another embodiment of the present invention, in which an extended lever 150' is separated from the stationary lever 140 and coupled to the stationary lever 140 as necessary. As shown therein, an end portion of the stationary lever 140 has an insertion hole 146 to receive an end portion of the detachable extended lever 150'. Therefore, the detachable extended lever 150' is separated from the insertion hole 146 when the pressurized container PC is packaged, carried or kept, and is inserted in and coupled to the insertion hole 146 at the dispensing works. Further, the detachable extended lever 150' may be manufactured to have a tubular shape by taking reduction of manufacturing costs, easiness of detachability, a feeling of grip, etc. into account.

Figure 6:
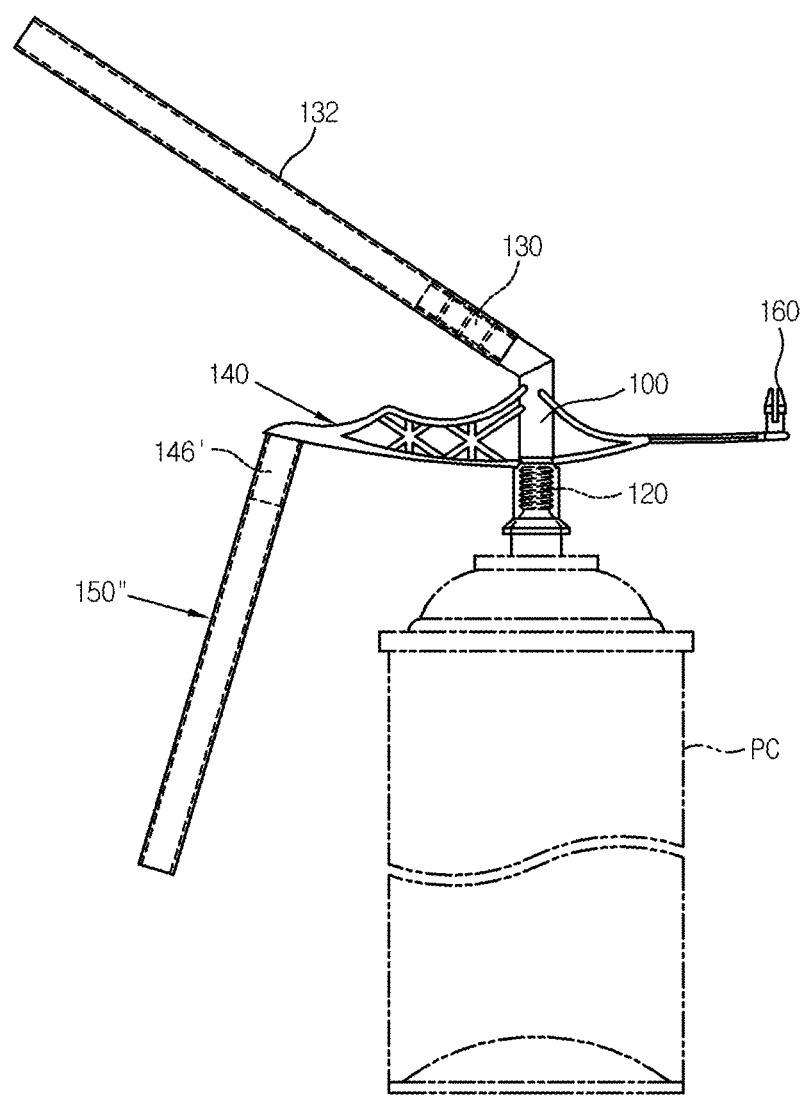
FIG. 6 is a front view of a disposable dispensing adaptor according to still another embodiment of the present invention.

FIG. 6 shows still another embodiment of a detachable extended lever 150". The extended lever 150" of FIG. 6 is manufactured to have a tubular shape, and detachably coupled to the stationary lever 140 as a coupling projection 146' provided in the stationary lever 140 is inserted in the extended lever 150".

According to the present invention, the extended lever 150, 150' or 150" coupled to the stationary lever 140 allows a worker to hold the pressurized container PC and the extended lever 150, 150' or 150" with one hand, thereby improving work efficiency and safety. Further, the blocking projection 152 of the extended lever 150, 150' or 150" is used for temporarily blocking up the end portion of the outlet pipe when the disposable dispensing adaptor is not in use, so that the disposable dispensing adaptor can be used again.

What is claimed is:

1. A dispensing adaptor for dispensing a fluid component retained in a pressurized container, the pressurized container having a valve stem through which the fluid component is to be discharged, wherein the dispensing adaptor comprises:

an adaptor main body having a stem coupling portion at a first end portion of the adaptor main body for coupling to the valve stem of the pressurized container, and a discharge pipe at a second end portion of the adaptor main body, the adaptor main body having an inner passageway in fluid communication with the valve stem for discharging the fluid component through the inner passageway;

a main lever formed integrally with and extending laterally outwardly to a first lateral side and a second lateral side from an outer wall of the adaptor main body, the main lever having a hinge projection at an upper portion of the first lateral side and a support projection at a lower portion of the first lateral side; and an extended lever coupled to the main lever, the extended lever having a first end and a second end opposite to the first end, the extended lever extending along a lengthwise downward direction of the pressurized container when coupled to the main lever for dispensing operation, the extended lever having a hinge projection at an upper portion of the first end of the extended lever and an accommodating groove at a lower portion of the first end of the extended lever, wherein the hinge projection of the main lever is pivotally coupled to the hinge projection of the extended lever by a hinge, and wherein the support projection of the main lever is inserted in and coupled to the accommodating groove of the extended lever for the dispensing operation, while allowing the support projection to be disengaged from the accommodating groove when the extended lever is pivotally moved by user about the hinge in a direction away from the pressurized container.

2. The dispensing adaptor according to claim 1, wherein the extended lever has a blocking projection at the second end of the extended lever, and the blocking projection is configured to be inserted to a free end of an outlet pipe coupled to the discharging pipe to block an external air from introducing into the discharge pipe, when the extended lever is rotated about the hinge of the main lever and the extended lever and causes the support projection of the main lever being detached from the accommodating groove of the extended lever.

3. The dispensing adaptor according to claim 2, wherein the outlet pipe coupled to the discharge pipe is bendable to facilitate insertion of the blocking projection of the extended lever to the free end of the outlet pipe.

4. The dispensing adaptor according to claim 2, further comprising a peg at the second lateral side of the main lever, the peg being configured to be detachably attached to a mounting adaptor of the pressurized container to facilitate carriage of the dispensing adaptor while being coupled with the pressurized container.

5. The dispensing adaptor according to claim 1, wherein the hinge is a film hinge.

* * * * *